Patented Feb. 9, 1954

2,668,808

UNITED STATES PATENT OFFICE 2,668,808

PROCESS OF PREPARING GUANIDINE-FORMALDEHYDE CONDENSATION PRODUCTS

Charles A. Robinson, Providence, R. I., assignor to Arnold, Hoffman & Co., Inc., Providence, R. I., a corporation of Rhode Island No Drawing. Application December 13, 1951, Serial No. 261,608

7 Claims. (Cl. 260—69)

This invention relates to the preparation of guanidine-formaldehyde condensation products suitable for improving the washfastness of substantive dyestuffs on cellulosic materials. More specifically, the invention relates to a process for preparing guanidine-formaldehyde dye-fixing agents starting with a material such as dicyandiamide from which the guanidine used for condensation may be conveniently prepared.

It is a well known fact that the wet fastness of dyeings on cellulosic materials may be improved by aftertreatment with products resulting from the condensation of guanidine with formaldehyde. Since such a material as dicyandiamide is less expensive than guanidine, it would be highly desirable to prepare condensation products suitable for dye-fixing purposes, if this were possible, using dicyandiamide in place of guanidine for reaction with the formaldehyde. Unfortunately, however, the products thus obtained are inferior to guanidine-formaldehyde condensation products for fixing substantive dyestuffs. Furthermore, while it is possible to produce guanidine from dicyandiamide for subsequent condensation with formaldehyde, known procedures for producing guanidine in this way are not satisfactory. For instance, some of these procedures require isolation and purification of intermediate products, and they are costly in labor, equipment, and yield, thereby obviating the advantages gained by using the less expensive dicyandiamide. On the other hand, if in these procedures the intermediates are not isolated, but are instead used in their impure forms, it has been found that the resulting condensation products show inferior dye-fixing properties. I have found that this is due to the presence of ammonia, ammonium hydroxide and/or ammonium salts which are also produced as by-products during conversion of the dicyandiamide to guanidine. This is rather surprising in view of U. S. Patent No. 2,214,067, which describes the use of a condensation product of guanidine or some other basic organic nitrogen compound with formaldehyde and an ammonium or amine salt as a dye-fixing agent. Nevertheless, with the addition of an ammonium salt, such as the chloride, sulfate, or carbonate, the reaction of guanidine with formaldehyde, under conditions which normally result in a superior dye-fixing agent, definitely affords a product with extremely poor washfast qualities. Likewise, when ammonium hydroxide is present in the condensation reaction, the product shows very poor washfastness.

One principal object of the present invention is to provide novel procedures for the preparation of guanidine-formaldehyde condensation products of superior dye-fixing properties starting with dicyandiamide or products intermediate between dicyandiamide and guanidine, namely, guanylurea and guanylurea salts, which procedures are free from the disadvantages previously encountered. A further object of the invention is to provide unique procedures for preparing guanidine-formaldehyde dye-fixing agents of maximum washfastness in high yield and economic fashion, using dicyandiamide, guanylurea or guanylurea salts as a starting material, which do not require the isolation of intermediate products formed during conversion of the starting material to guanidine. Still another object of the invention is the provision of procedures of the type broadly defined above for producing guanidine-formaldehyde condensation products in which the undesirable effects of ammonia, ammonium hydroxide and/or ammonium salts, formed during conversion of the dicyandiamide or other starting material to guanidine, on the properties of the resulting condensation products are eliminated.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art.

Briefly stated, the foregoing objects are accomplished, in accordance with the present invention, by a process involving the steps of first converting the dicyandiamide, guanylurea or guanylurea salts to guanidine carbonate whereupon ammonia and/or by-product ammonia salts are also formed, treating this conversion mixture with a base stronger than guanidine in at least sufficient quantity to convert the carbonate to free guanidine and the by-product ammonium salts to ammonium hydroxide, and thereafter reacting the guanidine thus obtained with formaldehyde to form the desired condensation product, the formaldehyde being used in sufficient excess so as to combine with the ammonium hydroxide formed during the conversion of the carbonate to free guanidine. The resulting mixture, after neutralization with acid and solubilization of the condensation product by heating, is then ready for application to previously dyed cellulosic materials in conventional manner.

The success of the instant invention lies, at least to a substantial extent, in using both the base and the formaldehyde in excess of that theoretically required for reaction with the guanidine carbonate and formation of the condensation product, respectively. Surprisingly, it has been found that the excess base overcomes the tendency of ammonium salts to interfere with the dye-fixing properties of the condensation product, and that the excess formaldehyde, likewise, overcomes possible interference by ammonium hydroxide.

The starting material, such as dicyandiamide, may be converted to guanidine carbonate in any appropriate manner. In a preferred procedure, the dicyandiamide is first converted to a guanylurea salt by acid hydrolysis, after which free guanylurea is obtained by treatment of the salt with an appropriate base, such as sodium hydroxide. The reaction mixture is then heated to hydrolyze guanylurea to guanidine carbonate according to the method described by K. Sugino and M. Yamasita (J. Soc. Chem. Ind. Japan, 45 Suppl. Binding, 1 (1942). Subsequent treatment of the guanidine carbonate with excess base, in accordance with the present invention, thus affords a solution containing free guanidine which may then be directly condensed with the excess formaldehyde, as stated, under mild reaction conditions to give the desired guanidine-formaldehyde condensation product.

The preferred procedure, briefly outlined above, may be illustrated by the following equations:

(1) Acid hydrolysis:

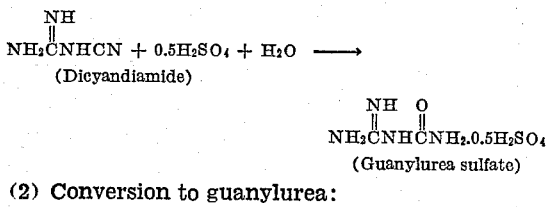

(2) Conversion to guanylurea:

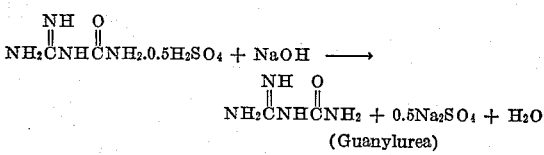

(3) Hydrolysis to guanidine carbonate:

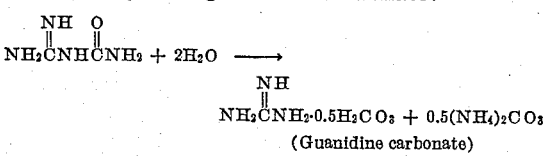

(4) Conversion to guanidine:

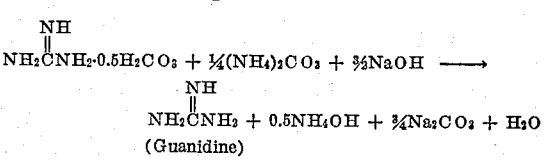

(5) Condensation with formaldehyde:

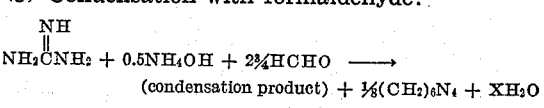

(6) Solubilization:

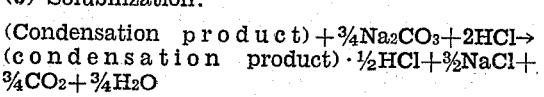

In the preferred process, shown above, one mole of dicyandiamide is hydrolyzed to guanylurea sulfate by boiling with 0.5 mole of sulfuric acid. Treatment with one mole of sodium hydroxide affords a solution of free guanylurea which is boiled to effect conversion to guanidine carbonate. In practice, up to one-half of the ammonium carbonate which is also formed sublimes off during the boiling. After adding 1.5 moles of sodium hydroxide, enough for conversion of the guanidine carbonate to free guanidine and also to compensate for the ammonium salt present, condensation with 2.75 moles of formaldehyde, sufficient excess to compensate for the ammonium hydroxide present, is carried out at 50° C. for two hours. The resulting material is neutralized with hydrochloric acid and solubilized by heating. When employed at an equivalent concentration, this product from dicyandiamide shows dye-fixation comparable in every way to that obtained using the product obtained when guanidine hydrochloride is the starting material.

A more complete understanding of the present invention may be had by reference to the following examples of actual operations in accordance with the invention. It will be understood, however, that these examples are given only for purposes of illustration and are not to be considered as in any way limiting the scope of the invention.

Example I

In a one liter three-necked flask fitted with stirrer, condenser, and dropping funnel, 84 g. (1.0 mole) of dicyandiamide and 110 g. of water were heated to reflux. A solution of 51 g. (0.51 mole) of concentrated sulfuric acid and 49 g. of water was added at such a rate that the heat of reaction maintained the mixture at the boiling point. After an addition period of 15 minutes, reflux was continued for 45 minutes.

The solution was then cooled to 65° C., a solution of 41 g. (1.02 moles) of sodium hydroxide and 41 g. of water was added, and the mixture was heated at reflux with stirring for two hours. During this time, ammonia was evolved, some ammonium carbonate collected in the condenser (total weight loss was 18 g.), and the pH dropped to 8.5.

After adding a solution of 60 g. (1.5 moles) of sodium hydroxide and 360 g. of water at 25 to 30° C., 222 g. (2.75 moles) of formaldehyde solution (37% by weight) was added. The reaction mixture was then heated at 50° C. with stirring for two hours. After adding concentrated hydrochloric acid to pH 6.5 and then as required to maintain the pH 6.5 to 7.0 while heating, the reaction mixture was refluxed for 5 minutes. A total 195 g. (2 moles) of concentrated hydrochloric acid was used. The clear, colorless solution weighed 1140 g.

For aftertreatment, a 4 g. piece of dyed cotton cloth was treated at 170° F. for ½ hour in 80 g. of a bath containing 0.52 g. of this product, 0.06 g. of cupric sulfate crystals, and 0.8 g. of sodium chloride.

Example II

Using double the quantities, the procedure described in Example I was followed to the decomposition of guanylurea which, in this case, was carried out at reflux for three hours; the weight loss was 32 g. The resulting solution was divided into four equal portions of 180 g. each, and these were reacted separately as described below:

(a) To one portion of 180 g. (containing 0.5 mole of guanidine) was added a solution of 20 g. (0.50 mole) of sodium hydroxide and 216 g. of water at 25 to 30° C. followed by 85 g. (1.05 moles) of formaldehyde solution. After stirring the reaction mixture at 50° C. for two hours, concentrated hydrochloric acid was added to pH 6.5 and then as required to maintain a pH of 6.5 to 7.0 while heating. Five minutes at reflux afforded a clear, colorless solution; weight 552 g.

(b) A procedure identical to that described under (a) was followed, except that 30 g. (0.75 mole) of sodium hydroxide and 206 g. of water were used.

(c) A procedure identical to that described under (a) was followed, except that 190 g. of water and 111 g. (1.37 moles) of formaldehyde solution were used.

(d) A procedure identical to that described under (a) was followed, except that 30 g. (0.75 mole) of sodium hydroxide, 180 g. of water, and 111 g. (1.37 moles) of formaldehyde solution were used.

Direct comparisons of the washfastness resulting from aftertreatment with these four products showed the recommended procedure (d) to be superior, the normal procedure (a) to be poor, with (b) and (c) intermediate.

Example III

To a warm mixture of 151 g. (0.50 mole) of guanylurea sulfate, a solution of 41 g. (1.02 moles) of sodium hydroxide and 41 g. of water was added. The process was continued as described in Example I.

Example IV

To 210 g. of a solution containing 0.50 mole of guanidine (prepared from the carbonate and barium hydroxide), 27 g. (0.50 mole) of ammonium chloride and 81 g. (1.0 mole) of formaldehyde solution were added. After heating at 50° C. for one hour, 14 ml. of glacial acetic acid was added. The resulting solution provided extremely poor washfastness when applied in the usual manner, thus emphasizing the undesirability of the presence of ammonium salts.

Example V

A procedure identical to that described under Example IV was followed, except that a solution of 20 g. (0.50 mole) of sodium hydroxide was added before adding the formaldehyde. In this case, the pH of the condensation reaction was 12.5 and sufficient glacial acetic acid was added to give a pH of 6.0 to 6.5. The dye-fixation afforded by the resulting product was vastly inferior, thus indicating the necessity of employing excess formaldehyde as well as additional base.

Example VI

To a solution of 40 g. (1.0 mole) of sodium hydroxide and 200 g. of water, 45 g. (0.25 mole) of guanidine carbonate, 29 g. (0.25 mole) of ammonium carbonate, 36 g. (0.25 mole) of sodium sulfate, and finally 142 g. (1.75 moles) of formaldehyde solution were added. After heating the solution at 50° C. for one hour, glacial acetic acid was added to neutrality and the mixture was heated to give complete solution. This product showed high washfastness when applied in the customary manner.

Example VII

To a solution of 40 g. (1.0 mole) of sodium hydroxide and 238 g. of water, 95.5 g. (1.0 mole) of guanidine hydrochloride, 60 g. (1.0 mole) of concentrated ammonium hydroxide, and finally 162 g. (2.0 moles) of formaldehyde solution were added. After holding the temperature at 50° C. for one hour, glacial acetic acid was added to bring the pH of the solution to 7.0. In the usual substantive aftertreatment, this product showed poor fastness to washing.

Example VIII

An identical procedure to that described under Example VII was followed, except that 284 g. (3.5 moles) of formaldehyde solution was used, and the amount of water was reduced to 116 g. The washfastness shown by this product was equivalent to that obtained using the guanidine-formaldehyde condensation product prepared without ammonium hydroxide present.

Any base stronger than guanidine itself, or mixtures of such bases, may be employed for addition to the guanidine carbonate for the purpose of forming free guanidine and overcoming the tendency of ammonium salts to interfere with the formaldehyde condensation of the guanidine in accordance with the present invention. Preferably, however, for purposes of convenience and economy, such bases as sodium and potassium hydroxide are employed.

The amount of base employed may be rather widely varied and depends upon a number of factors, particularly, the amount of ammonium salts present. As indicated above, sufficient base should be used to convert the guanidine carbonate to free guanidine and to combine with the ammonium salts present. In general, one mole of base, in excess of the two moles required per mole of guanidine carbonate, is employed for each equivalent of ammonium salt present, thus, in the case in which up to one-half mole of ammonium carbonate is present, a total of two to three moles of base such as sodium hydroxide is used, although a somewhat greater proportion of the base will not be detrimental.

In the customary condensation of guanidine with formaldehyde, varying amounts of the reactants may be employed, although most frequently about 2 moles of formaldehyde are used for each mole of guanidine. In accordance with the present procedures, somewhat more formaldehyde than customary is employed, the excess being sufficient to combine with any ammonium hydroxide which may have been formed.

As will be appreciated, the amount of excess formaldehyde employed necessarily will vary, dependent upon the quantity of ammonium hydroxide. Generally speaking, at least one mole of formaldehyde, and normally up to 1.5 moles thereof, in excess of that required for the condensation, should be utilized per mole of ammonium hydroxide, although somewhat higher proportions of formaldehyde do not interfere with the properties of the condensation product obtained or otherwise cause any procedural difficulties.

While the specific examples given above are concerned with the use of dicyandiamide as a starting material, it will be appreciated that the process may also be carried out starting with the products intermediately formed, namely, guanylurea and the guanylurea salts. Thus, for example, guanylurea sulfate may be used as a starting material in lieu of dicyandiamide in which case a procedure similar to that outlined above is followed, except that in this case, the initial hydrolysis step is not necessary.

In condensing the guanidine with the formaldehyde, reaction conditions are somewhat more important and, it is generally preferred to employ mild reaction conditions, since the best dye-fixing agents are normally obtained under such circumstances. As will be appreciated, the temperatures and times employed for the condensation are dependent upon one another, i. e., the higher the temperature employed, the shorter may be the length of the reaction. Generally speaking, it is preferred to carry out the condensation within a temperature range of about 20 to 80° C. for from one to twenty hours, although temperatures and times outside these ranges may also be employed, but with perhaps less satisfactory results.

The conditions necessary for conversion of the starting material, i. e., dicyandiamide, guanylurea or the guanylurea salts, have previously been described and are well understood by those skilled in the art. When using dicyandiamide, acid hydrolysis may be effected with any appropriate acid, such as acetic, hydrochloric and sulfuric acids, and subsequent conversion to guanylurea may be obtained using any strong base, for example, sodium and potassium hydroxides. In subsequently hydrolyzing the guanylurea to guanidine carbonate, the reaction should be continued until such time as a test for guanylurea is no longer obtained.

Solubilization of the condensation product and its application to dyed cellulosic materials may be effected in the usual way. In general, solubilization is accomplished by first neutralizing the reaction mixture with an appropriate acid, such as acetic, lactic, hydrochloric or sulfuric, followed by refluxing the reaction mixture until the condensation product is dissolved and a clear, colorless solution obtained. This solution may then be used as an aftertreatment, in conventional manner, with a copper salt, such as copper chloride, sulfate or acetate.

As will be appreciated from the foregoing, the procedure of the present invention affords a number of unique advantages over the prior procedures for preparing guanidine-formaldehyde dye-fixing agents. Some of these advantages are (a) dicyandiamide may be employed as a starting material in lieu of the more expensive guanidine; (b) separation and purification of intermediate products, formed during conversion of the starting material to guanidine, are not necessary; and (c) the tendency of ammonia, ammonium salts and ammonium hydroxide to interfere with the guanidine-formaldehyde condensation, and thus give a product of inferior dye-fixing properties, is eliminated.

It will be appreciated that the foregoing description has been given for purposes of explanation only and that variations may be made in the procedures described without in any way deviating from the invention as defined in the appended claims.

I claim:

1. The process of claim 3 wherein from about 1 to 1.5 moles of formaldehyde in excess of that required for condensation with guanidine per mole of ammonium hydroxide present is employed.

2. The process of claim 3 wherein the base used for conversion of said salt is an alkali metal hydroxide.

3. A process for producing guanidine-formaldehyde condensation products from a guanidine salt containing ammonia impurities which comprises reacting said salt with a base stronger than guanidine in at least sufficient quantity to convert said salt to free guanidine and said impurities to ammonium hydroxide, and reacting said guanidine with formaldehyde in sufficient excess to both form said condensation product and combine with the ammonium hydroxide in said reaction mixture.

4. The process of claim 3, wherein the guanidine salt containing the ammonia impurities is derived from dicyandiamide.

5. The process of claim 3, wherein the guanidine salt containing the ammonia impurities is derived from guanylurea.

6. The process of claim 3, wherein the guanidine salt containing the ammonia impurities is derived from a guanylurea salt.

7. A process for producing guanidine-formaldehyde condensation products from guanidine carbonate containing in admixture therewith ammonia and ammonium salts as impurities, which comprises reacting said carbonate with a base stronger than guanidine in at least sufficient quantity to convert said carbonate to free guanidine and said impurities to ammonium hydroxide, and reacting said guanidine with formaldehyde in sufficient excess to both form said condensation product and combine with the ammonium hydroxide in said reaction mixture.

CHARLES A. ROBINSON.

References Cited in the file of this patent

UNITED STATES PATENTS

| Number | Name | Date |
| --- | --- | --- |
| 1,780,636 | Stine | Nov. 4, 1930 |